(12) United States Patent
Liang et al.

(10) Patent No.: US 12,531,676 B2
(45) Date of Patent: Jan. 20, 2026

(54) METHODS, DEVICES, AND COMPUTER READABLE MEDIUM FOR COMMUNICATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 18/012,690

(22) PCT Filed: Jun. 24, 2020

(86) PCT No.: PCT/CN2020/098232
§ 371 (c)(1),
(2) Date: Dec. 23, 2022

(87) PCT Pub. No.: WO2021/258365
PCT Pub. Date: Dec. 30, 2021

(65) Prior Publication Data
US 2023/0275711 A1    Aug. 31, 2023

(51) Int. Cl.
*H04L 5/00* (2006.01)
*H04W 72/044* (2023.01)

(52) U.S. Cl.
CPC ......... *H04L 5/0012* (2013.01); *H04W 72/044* (2013.01)

(58) Field of Classification Search
None
See application file for complete search history.

(56) References Cited

U.S. PATENT DOCUMENTS

| 11,290,999 B2* | 3/2022 | Liu .................. H04W 72/0446 |
| 2014/0105155 A1 | 4/2014 | Kim et al. |
| 2017/0079025 A1 | 3/2017 | Jiang et al. |
| 2018/0199359 A1 | 7/2018 | Cao et al. |
| 2019/0109732 A1 | 4/2019 | Choi et al. |

(Continued)

FOREIGN PATENT DOCUMENTS

| CN | 104283581 A | 1/2015 |
| CN | 108989003 A | 12/2018 |

(Continued)

OTHER PUBLICATIONS

NTT Docomo, Inc., "Remaining issues for PUSCH enhancements for Rel. 16 Urllc", 3GPP TSG RAN WG1 #100, R1-2000921, e-Meeting, Feb. 24-Mar. 6, 2020, pp. 1-10.

(Continued)

*Primary Examiner* — Saumit Shah
(74) *Attorney, Agent, or Firm* — Sughrue Mion, PLLC

(57) ABSTRACT

Example embodiments of the present disclosure relate to communication. According to embodiments of the present disclosure, a network device transmits configuration information for one or more frequency hopping modes to a terminal device. The terminal device determines which frequency hopping mode is used and also determines a plurality of frequency hopping positions based on the configuration information. In this way, it can have more frequency hopping positions which achieve more frequency diversity gain and benefit to coverage enhancement. Further, the frequency hopping frequency is configured more flexible.

9 Claims, 7 Drawing Sheets

(56) References Cited

U.S. PATENT DOCUMENTS

| | | | |
|---|---|---|---|
| 2020/0008222 | A1 | 1/2020 | Cao et al. |
| 2020/0099500 | A1 | 3/2020 | Huang et al. |
| 2020/0295973 | A1 | 9/2020 | Choi et al. |
| 2021/0360616 | A1* | 11/2021 | Yi .................. H04L 5/0053 |
| 2022/0159682 | A1* | 5/2022 | Liu .................. H04W 72/23 |
| 2022/0393793 | A1 | 12/2022 | Mu |
| 2023/0015550 | A1* | 1/2023 | Lin .................. H04W 74/0833 |
| 2023/0048695 | A1* | 2/2023 | Kim .................. H04L 5/0094 |

FOREIGN PATENT DOCUMENTS

| | | |
|---|---|---|
| CN | 110546913 A | 12/2019 |
| CN | 110999338 A | 4/2020 |
| JP | 2018-508159 A | 3/2018 |
| WO | 2018/127201 A1 | 7/2018 |
| WO | 2019/097658 A1 | 5/2019 |
| WO | 2020/051043 A1 | 3/2020 |
| WO | 2020/063563 A1 | 4/2020 |

OTHER PUBLICATIONS

"3rd Generation Partnership Project; Technical Specification Group Radio Access Network; NR; Physical layer procedures for data (Release 16)", 3GPP TS 38.214 V16.0.0, Dec. 2019, pp. 1-147.

International Search Report of PCT/CN2020/098232 dated Mar. 2, 2021 [PCT/ISA/210].

Written Opinion of PCT/CN2020/098232 dated Mar. 2, 2021 [PCT/ISA/237].

Huawei "Addition of serving cell ID and BWP Id in references to NZP-CSI-RS-Resource" 3GPP TSG-RAN WG2 Meeting #102, Korea, May 21-25, 2018, R2-1807990, (18 pages).

Huawei "Long duration PUCCH structure", 3GPP TSG RAN WG1 Meeting #89; China, May 15-19, 2017, R1-1706953, (7 pages).

CMCC, "Discussion on remaining issues for semi-static DL-UL assignment", 3GPP TSG-RAN WG1 Meeting NR-Adhoc, R1-1800545, Canada, Jan. 22-26, 2018 (12 pages).

Partial Supplementary European Search Report dated Jul. 17, 2023 in Application No. 20941645.2.

JP Office Action for JP Application No. 2022-580013, mailed on May 28, 2024 with English Translation.

Apple Inc., "Remaining issues on PUSCH enhancements", 3GPP TSG RAN WG1 #100-e R1-2000856, Feb. 24-Mar. 6, 2020, p. 1-p. 4.

ZTE, "PUSCH enhancements for NR URLLC", 3GPP TSG RAN WG1 #98 R1-1908237, Aug. 26-30, 2019, p. 1-p. 9.

CATT, "Clarification on PUSCH frequency hopping", 3GPP TSG RAN WG1 #100b_e R1-2002063, Apr. 20-30, 2020, p. 1-p. 3.

Huawei et al., "Addition of serving cell ID and BWP Id in references to NZP-CSI-RS-Resource", 3GPP Tsg Ran WG2 #102 R2-1807990, May 21-25, 2018, p. 1-p. 18.

CMCC, "Discussion on remaining issues for semi-static DL-UL assignment", 3GPP TSG RAN WG1 adhoc_NR AH 1801 R1-1800545, Jan. 22-26, 2018, pp. 1-pp. 12.

Extended European Search Report for EP Application No. 20941645.2, dated on Nov. 8, 2023.

Samsung, "PUSCH enhancement for URLLC", 3GPP TSG RAN WG1 Ad-Hoc Meeting 1901, R1-1901068, Jan. 11, 2019, p. 1-p. 4.

VIVO, "Layer 1 enhancements for Urllc", 3GPP TSG RAN WG1 Meeting #94bis, R1-1810395, Sep. 29, 2018, p. 1-p. 12.

CATT, "Corrections to DL/UL scheduling and HARQ management", 3GPP TSG RAN WG 1 Meeting #94, R1-1808380, Aug. 11, 2018, pp. 1-pp. 16.

Interdigital Inc, "Simulation assumptions for FR2 UL", 3GPP TSG RAN WG1 #101, R1-2004305, May 16, 2020, p. 1-p. 5.

CN Office Action for CN Application No. 202080102421.9, mailed on Feb. 28, 2025 with English Translation.

* cited by examiner

METHODS, DEVICES, AND COMPUTER READABLE MEDIUM FOR COMMUNICATION

CROSS REFERENCE TO RELATED APPLICATIONS

This application is a National Stage of International Application No. PCT/CN2020/098232, filed Jun. 24, 2020.

FIELD

Embodiments of the present disclosure generally relate to the field of telecommunication, and in particular, to methods, devices, and computer readable medium for communication.

BACKGROUND

With development of communication systems, more and more technologies have been proposed. Frequency hopping is a method of transmitting radio signals by rapidly changing the carrier frequency among many frequencies occupying a large spectral band.

The changes are controlled by a code known to both transmitter and receiver. The frequency hopping is used to avoid interference, to prevent eavesdropping. In frequency hopping systems, the transmitter changes the carrier frequency according to a certain hopping pattern. The advantage is that the signal sees a different channel and a different set of interfering signals during each hop. This avoids the problem of failing communication at a particular frequency, because of a fade or a particular interferer.

SUMMARY

In general, example embodiments of the present disclosure provide a solution for communication.

In a first aspect, there is provided a terminal device. The terminal device comprises at least one processor; and at least one memory including computer program codes; the at least one memory and the computer program codes are configured to, with the at least one processor, cause the terminal device to perform acts, the acts comprising: receiving from a network device, configuration information for at least one frequency hopping mode, the configuration information indicating a set of candidate frequency offsets between two frequency hops in the at least one frequency hopping mode; and determining a plurality of frequency hopping positions for a target frequency hopping mode based on the configuration information.

In a second aspect, there is provided a network device. The network device comprises at least one processor; and at least one memory including computer program codes; the at least one memory and the computer program codes are configured to, with the at least one processor, cause the network device to perform acts, the acts comprising: generating configuration information for at least one frequency hopping mode, the configuration information indicating a set of candidate frequency offsets between two frequency hops in the at least one frequency hopping mode; and transmitting the configuration information to a terminal device.

In a third aspect, there is provided a method. The method comprises receiving, at a terminal device and from a network device, configuration information for at least one frequency hopping mode, the configuration information indicating a set of candidate frequency offsets between two frequency hops in the at least one frequency hopping mode; and determining a plurality of frequency hopping positions for a target frequency hopping mode based on the configuration information.

In a fourth aspect, there is provided a method. The method comprises generating, at a network device, configuration information for at least one frequency hopping mode, the configuration information indicating a set of candidate frequency offsets between two frequency hops in the at least one frequency hopping mode; and transmitting the configuration information to a terminal device.

In a fifth aspect, there is provided an apparatus. The apparatus comprises means for receiving, at a terminal device and from a network device, configuration information for at least one frequency hopping mode, the configuration information indicating a set of candidate frequency offsets between two frequency hops in the at least one frequency hopping mode; and means for determining a plurality of frequency hopping positions for a target frequency hopping mode based on the configuration information.

In a sixth aspect, there is provided an apparatus. The apparatus comprises means for generating, at a network device, configuration information for at least one frequency hopping mode, the configuration information indicating a set of candidate frequency offsets between two frequency hops in the at least one frequency hopping mode; and means for transmitting the configuration information to a terminal device.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
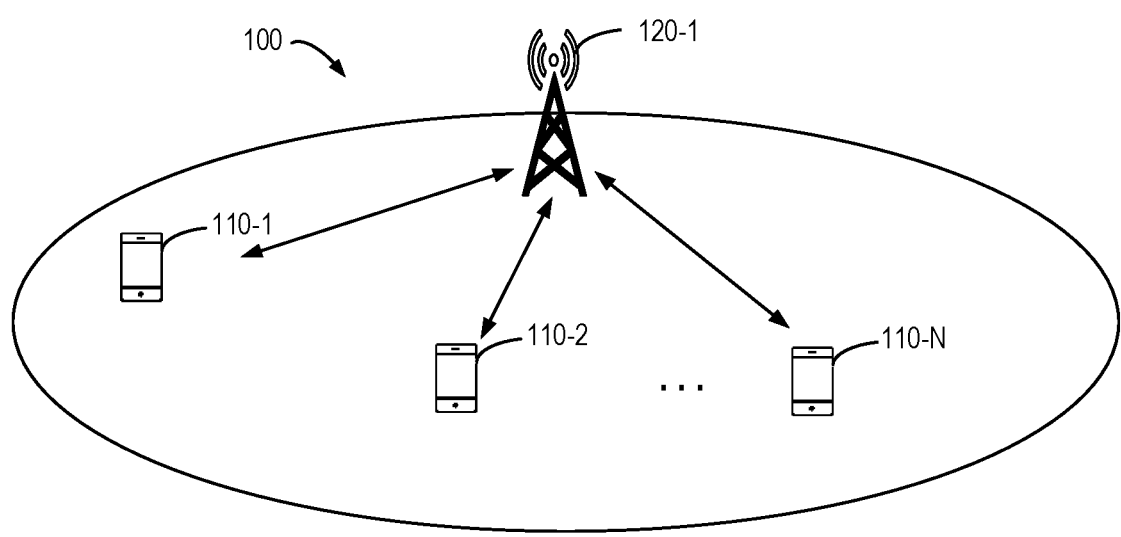
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.85G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned above, the technology of frequency hopping has been introduced. Frequency hopping has benefit for coverage enhancement, so the enhanced hopping is introduced. One of solutions for coverage enhancement is to increase diversity of transmission, and frequency hopping can provide the frequency diversity. So the enhanced frequency hopping is beneficial to enhance coverage. Uplink frequency hopping is adopted in new radio (NR) systems for physical uplink shared channel (PUSCH) and physical uplink control channel (PUCCH).

The frequency hopping may include intra-slot hopping and inter-slot hopping. The inter-slot hopping is used together with repetition/multiple-slot scheduling of PUSCH/PUCCH. The hopping has two starting resource blocks (RBs), the first (even) hop uses the first starting RB and the second (odd) hop uses the second starting RB. The first starting RB is indicated by frequency resource allocation in downlink control information as normal and the second starting RB is the first starting RB plus an offset. The offset is indicated by DCI among at most 4 candidates configured by RRC. Further, interlaced resource allocation has been introduced in NR for NR operation on unlicensed band.

According to embodiments of the present disclosure, a network device transmits configuration information for one or more frequency hopping modes to a terminal device. The terminal device determines which frequency hopping mode is used and also determines a plurality of frequency hopping positions based on the configuration information. In this way, it can have more frequency hopping positions which achieve more frequency diversity gain and benefit to coverage enhancement. Further, the frequency hopping frequency is configured more flexible.

FIG. 1 illustrates a schematic diagram of a communication environment 100 in which embodiments of the present disclosure can be implemented. The communication environment 100, which is a part of a communication network, comprises a terminal device 110-1, a terminal device 110-2, . . . , a terminal device 110-N, which can be collectively referred to as "terminal device(s) 110." The communication environment 100 further comprises a network device 120 that can communicate with the first device(s) 210.

The communication environment 100 may comprise any suitable number of devices and cells. In the communication environment 100, the terminal devices 110 and the network devices 120 can communicate data and control information to each other. The network devices 2120 can also exchange information with each other.

It is to be understood that the number of network devices and cells and their connections shown in FIG. 1 is given for the purpose of illustration without suggesting any limitations. The environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
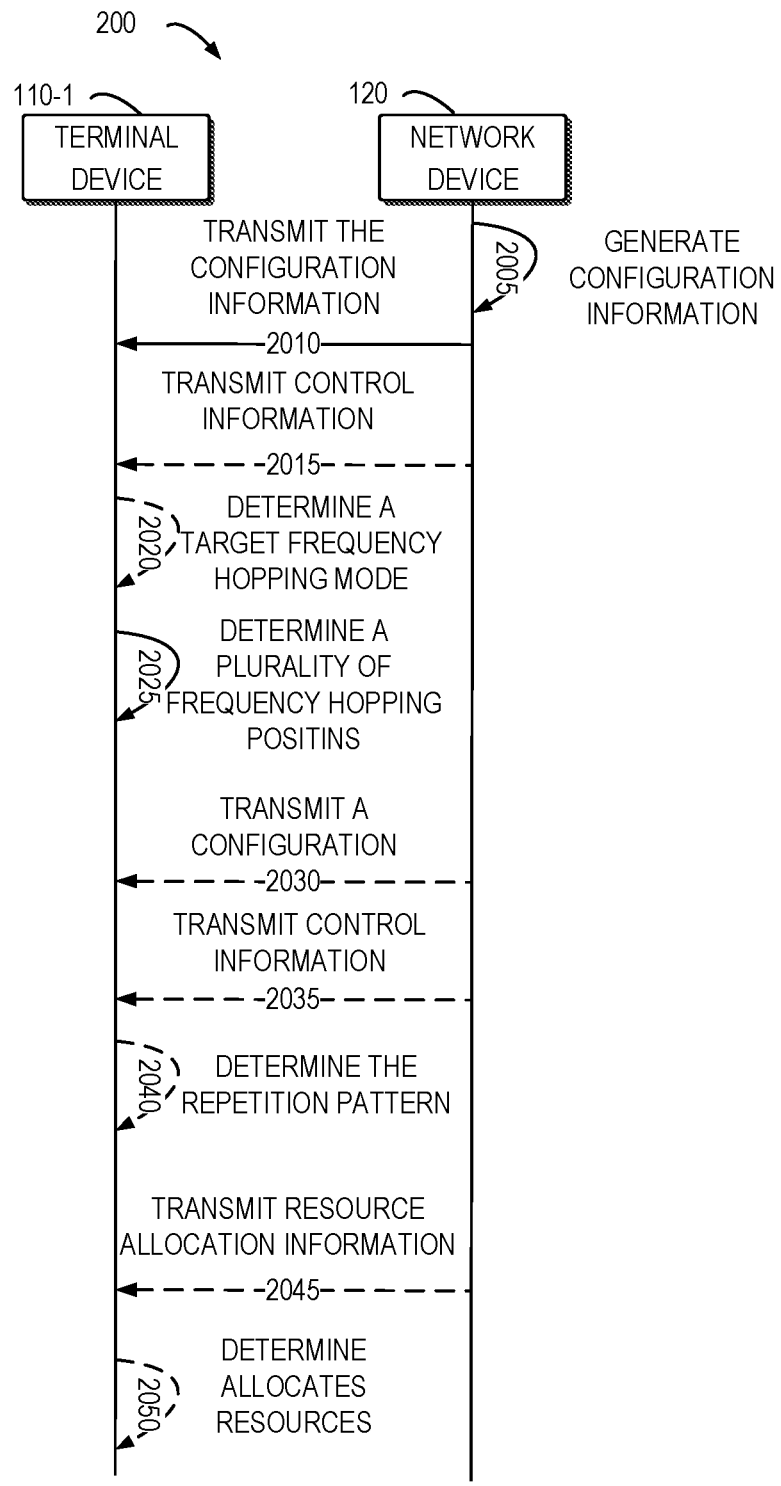
FIG. 2 illustrates a signaling flow for counting terminal devices according to some embodiments of the present disclosure.

Example embodiments of the present disclosure will be described in detail below with reference to the accompanying drawings. Reference is now made to FIG. 2, which illustrates a signaling flow 200 for frequency hopping according to example embodiments of the present disclosure. For the purpose of discussion, the signaling flow 200 will be described with reference to FIG. 1. Only for the purpose of illustrations, the signaling flow 200 may involve the terminal device 110-1 and the network device 120.

The network device 120 generates 2005 configuration information for one or more frequency hopping modes. In some embodiments, the configuration information may indicate a start RB for frequency hopping. The configuration information also indicates one or more frequency offsets between tow frequency hops. In this way, the frequency diversity has been increased, thereby improving enhancement coverage.

In an example embodiment, the configuration information may be for a first frequency hopping mode. In this situation, the configuration information may indicate an initial frequency offset between two frequency hops. For example, for inter-slot hopping, the configuration information may indicate the start RB to be determined based on:

$$RB_{start}(n_s^\mu) = (RB_{start} + m \times RB_{offset}) \bmod N_{BWP}^{size} \tag{1}$$

where $m=n_s^\mu \bmod M$, M represents the number of frequency hops, $RB_{offset}$ represents the initial frequency offset between two frequency hops, $RB_{start}$ represents the starting RB within the bandwidth part (BWP), $n_s^\mu$ is the current slot number within a radio frame, $N_{BWP}^{size}$ represents the number of physical resource blocks (PRB) in initial uplink BWP, and m represents the multiple value of the initial frequency offset. The parameter M may be configured by the network device 120, which will be described later.

Alternatively or in addition, for inter-repetition hopping, the configuration information may indicate the start RB to be determined based on:

$$RB_{start}(n) = (RB_{start} + m \times RB_{offset}) \bmod N_{BWP}^{size} \tag{2}$$

where $m=n \bmod M$, M represents the number of frequency hops, $RB_{offset}$ represents the initial frequency offset between two frequency hops, $RB_{start}$ represents the starting RB within the bandwidth part (BWP), n is the $n^{th}$ frequency hopping, $N_{BWP}^{size}$ represents the number of physical resource blocks (PRB) in initial uplink BWP, and m represents the multiple value of the initial frequency offset. The parameter M may be configured by the network device 120, which will be described later. In this way, embodiments of this application are simple to achieve. Further, it needs less radio resource control (RRC) signaling. Moreover, it also provides flexibility for configuring the frequency hopping. Only for the purpose of illustrations, the parameter n represents the $n^{th}$ frequency hopping in the first frequency hopping mode and the parameter "n'" is used in the second and third frequency hopping mode. Specific definition of the parameter "n'" may be given later.

In another example embodiment, the configuration information may be for a second frequency hopping mode. In this situation, the configuration information may indicate a plurality of lists of frequency offsets. For example, the configuration information may comprise the parameter "frequencyHoppingOffsetLists-r17" which represents SEQUENCE (SIZE (1 . . . 4)) OF frequencyHoppingOffset-r17." The parameter "frequencyHoppingOffset-r17" may be represented as "SEQUENCE (SIZE (1 . . . maxNrofHopping)) OF INTEGER (1 . . . maxNrofPhysicalResourceBlocks−1)." For example, the configuration information may indicate the start RB to be determined based on:

$$RB_{start}(n') = (RB_{start} + RB_{offset}(k)) \bmod N_{BWP}^{size} \tag{3}$$

where $k=n' \bmod K$, K represents the size of the frequencyHoppingOffset-r17 which may be indicated by downlink control information among frequencyHoppingOffsetLists-r17, $RB_{offset}(k)$ represents the frequency offset between two frequency hops, $RB_{start}$ represents the starting RB within the bandwidth part (BWP), k is the $k^{th}$ frequency hopping, $N_{BWP}^{size}$ represents the number of physical resource blocks (PRBs) in initial uplink BWP, n' is the current slot number within a radio frame. In this way, the frequency hopping can be configured more flexible.

In another example embodiment, the configuration information may be for a third frequency hopping mode. In this situation, the configuration information may indicate a list of frequency offsets. For example, the configuration information may comprise the parameter "frequencyHoppingOffsetLists" which represents SEQUENCE (SIZE (1 . . . 4)) OF INTEGER (1 . . . maxNrofPhysicalResourceBlocks−1)." For example, the configuration information may indicate the start RB to be determined based on:

$$RB_{start}(n') = (RB_{start} + RB_{offset}(k)) \bmod N_{BWP}^{size} \tag{4}$$

where $k=n' \bmod K$, K is the number of frequencyHoppingOffsetList plus one, $RB_{offset}(k)$ represents the frequency offset between two frequency hops, $RB_{start}$ represents the starting RB within the bandwidth part (BWP), $RB_{offset}(k)$ is the $k^{th}$ number in the frequencyHoppingOffsetList and $RB_{offset}(0)=0$, $N_{BWP}^{size}$ represents the number of physical resource blocks (PRBs) in initial uplink BWP, n' is the current slot number within a radio frame. In this way, the RRC signaling can be saved.

The network device 120 transmits 2010 the configuration information to the terminal device 110-1. For example, the configuration information can be transmitted to via the RRC signaling. It should be noted that the configuration information can be transmitted via any suitable signaling, e.g. RRC, MAC CE, DCI.

In some embodiments, the network device 120 may transmit 2015 control information to the terminal device 110-1. In some embodiments, the control information may comprise an explicit indication (referred to as "a first indication") to indicate the target frequency hopping mode which is to be used by the terminal device 110-1. For example, one or more bits in the control information may be used to indicate the target frequency hopping mode. Alternatively, the control information may Alternatively or in addition, the control information may comprise a second indication related to the set of candidate frequency offset. For example, for the first frequency hopping mode, the second indication may indicate the multiple value of the initial frequency offset. Alternatively, in the second frequency hopping mode, the second indication may comprise one bit to indicate which list of frequency offset in the plurality of lists of frequency offset is used. Alternatively, the control information may comprise an implicit indication to indicate the target frequency hopping mode. For example, if the control information indicate the multiple value of the initial frequency offset, it may implicitly indicate that the first frequency hopping mode is used. Alternatively, if the control information comprise one bit to indicate which list of frequency offset in the plurality of lists of frequency offset is used, it may implicitly indicate that the second frequency hopping mode is used.

In some embodiments, the terminal device 110-1 may determine 2020 a target frequency hopping mode from the one or more frequency hopping modes. In some embodiments, the terminal device 110-1 may determine the target frequency hopping mode based on the control information. Alternatively, the target frequency hopping mode can be determined without the control information. For example, if a reserved bit field in the configuration information indicates "11", the terminal device 110-1 may determine that the third frequency hopping mode is triggered.

The terminal device 110-1 determines 2025 a plurality of frequency hopping positions for the target frequency hopping mode based on the configuration information. For example, in an example embodiment, the configuration information may be for a first frequency hopping mode. The parameter M in above formulas (1) and (2) which represents the number of frequency hops may be configured by the network device 120. In some embodiments, the parameter M may be any suitable specified number, for example, 3, 4, 6 or 8. Alternatively or in addition, if the control information the multiple value of is the initial frequency offset, the plurality of frequency hopping positions can be determined based on the initial frequency offset (for example, $RB_{offset}$ in above formulas (1) and (2)), the multiple value (for example, m in above formulas (1) and (2)) and the start resource block. For example, the plurality of frequency hopping positions may be obtained using the formula (1) or (2).

In other example embodiment, the configuration information may be for a second frequency hopping mode. In this situation, the terminal device 110-1 may select a target list of frequency hopping offsets based on the second indication and determine the plurality of frequency hopping positions based on the target list of frequency hopping offsets and the start resource block. For the purpose of illustrations, the plurality of lists of frequency offsets may be {{0, 50}, {0, 20, 40, 60}}. If the second indication may indicate "0", the target list of frequency hopping offset {0, 50} is selected. Thus, the plurality of frequency hopping positions may be the start RB, the start RB+50.

Alternatively, if the second indication may indicate "1", the target list of frequency hopping offset {0, 20, 40, 60} is selected. If should be noted that the second indication may indicate any suitable bit value. Thus, the plurality of frequency hopping positions may be the start RB, the start RB+20, the start RB+40 and the start RB+60.

In another example embodiment, the configuration information may be for the third frequency hopping mode. In this situation, the configuration information may indicate a list of frequency offsets. For the purpose of illustrations, the list of frequency offsets may be {0, 20, 40, 60}. Thus, the plurality of frequency hopping positions may be the start RB, the start RB+20, the start RB+40 and the start RB+60.

The network device may transmit 2030 a configuration related to a repetition frequency hopping pattern to the terminal device 110-1. For example, the configuration may indicate a configurable number "R." The configurable number R may be used to indicate a channel in a slot can be inferred from a channel in another slot within R slots. Alternatively, the configurable number R may be used to indicate the hopping pattern within R slot is the same start RB and hopping is for every R slot. The configuration may indicate a list of R values by RRC.

The network device 120 may also transmit 2035 control information indicating the number of slots for one repetition and a further frequency offset between two repetitions. For example, the number of slots may be a specific R from the list of R values. The is specific R could be indicated by DCI. The terminal device 110-1 may determine 2040 the repetition frequency hopping pattern based on the number of slot, the further frequency offset and the configuration. In this way, the cross slot channel estimation can be achieved, thereby improving demodulation performance. For example, the start RB can be determined based on:

$$RB_{start}(n') = \begin{cases} RB_{start} & , \text{if FLOOR}(n') \\ (RB_{start} + RB_{offset}) \bmod N_{BWP}^{size} & , \text{if FLOOR}(n'/R) \bmod 2 = 1 \end{cases} \quad (5$$

where $RB_{offset}$ represents the frequency offset between two frequency hops, $RB_{start}$ represents the starting RB within the bandwidth part (BWP), $N_{BWP}^{size}$ represents the number of physical resource blocks (PRBs) in initial uplink BWP, n' is the current slot number within a radio frame.

Figure 3:
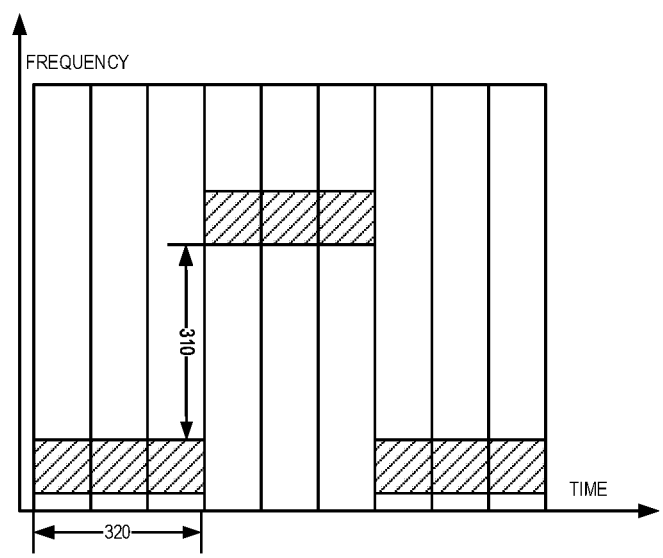
FIG. 3 illustrates a schematic block of a frequency hopping pattern according to some embodiments of the present disclosure.
Figure 5:
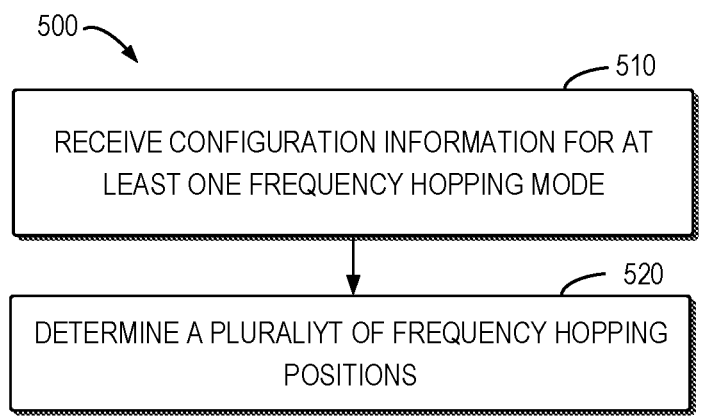
FIG. 5 illustrates a flowchart of a method implemented at a terminal device according to some example embodiments of the present disclosure.

For example, if the further frequency offset indicated by DCI is 50 and R is 3, the number of slots for one repletion (for example, shown as 320) is 3. As shown in FIG. 5, the frequency offset between two repetition (for example, shown as 310) is 50. Only for the purpose of illustrations, as shown in FIG. 3, the start RBs can be at the initial start RB, the initial start RB, the initial start RB, the initial start RB+50, the initial start RB+50, the initial start RB+50, the initial start RB, the initial start RB and the initial start RB.

Alternatively, the start RB can be determined based on:

$$RB_{start}(n') = (RB_{start} + m \times RB_{offset}) \bmod N_{BWP}^{size} \quad (6)$$

where m=FLOOR(n'/R) mod M, $RB_{offset}$ represents the initial frequency offset between two frequency hops, $RB_{start}$ represents the starting RB within the bandwidth part (BWP), n' is the current slot number within a radio frame, $N_{BWP}^{size}$ represents the number of physical resource blocks (PRB) in initial uplink BWP, and m represents the multiple value of the initial frequency offset, n' is the current slot number within a radio frame.

Similarly, the above formulas (3) and (4) may also be applicable in this scenario. That is to say, the start RB can be determined based on the above formulas (3) and (4). For example, the parameter k in above formulas (3) and (4) may be defined as "k=FLOOR(n'/R)mod K."

In some embodiments, if the interlace number is fixed, i.e. 10 interlaces for 15 KHz and 5 interlaces for 30 KHz, it is not good scenario to enhance coverage since there are too many RB in one interlace. To utilize interlaced resource allocation in coverage enhancement, more interlaces (less RB in one interlace) is needed. The interlace number may be configured by dedicated RRC or broadcast RRC. In another example embodiment, the network device 120 may transmit 2045 resource allocation information indicating a type of resource allocation and an interlaced number. For example, the bit field of dynamic switching between is CEIL (log 2($N_{RB}^{UL} \times (N_{RB}^{UL}+1)/2$))+1. The most significant bit is to indicated the type resource allocation. If the type is interlace allocation, the least significant bit (LSB) of CEIL (log 2($N_{INTERLACE}^{UL} \times (N_{INTERLACE}^{UL}+1)/2$)) bits provides the frequency domain resource allocation, where $N_{INTERLACE}^{UL}$ is interlace number. If the type is continuous allocation, the least significant bit (LSB) of CEIL (log 2($N_{RB}^{UL} \times (N_{RB}^{UL}+1)/2$)) bits provides the frequency domain resource allocation, where $N_{RB}^{UL}$ is RB number in uplink Band Width Part (BWP).

Figure 4:
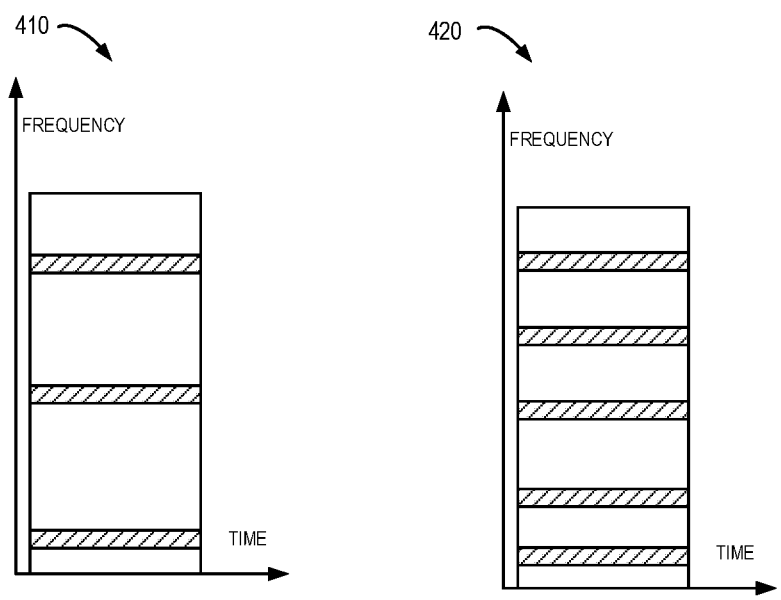
FIG. 4 illustrates a schematic block of interlaces resource allocation according to some embodiments of the present disclosure.

The terminal device 110-1 may determine 2050 allocated resources based on the type of resource allocation and the interlaced number. As shown in FIG. 4, if the RB number in one interlace is 3, the determined resource allocation is shown as 410 and if the RB number in one interlace is 5, the determined resource allocation is shown as 420.

FIG. 5 shows a flowchart of an example method 500 implemented at a terminal device 110 in accordance with some example embodiments of the present disclosure. For the purpose of discussion, the method 500 will be described from the perspective of the terminal device 110-1.

At block 510, the terminal device 110-1 receives configuration information from the network device 120. For example, the configuration information can be transmitted to via the RRC signaling. It should be noted that the configuration information can be transmitted via any suitable signaling.

In some embodiment, the configuration information may indicate a start RB for frequency hopping. The configuration information also indicates one or more frequency offsets between tow frequency hops. In this way, the frequency diversity has been increased, thereby improving enhancement coverage.

In an example embodiment, the configuration information may be for a first frequency hopping mode. In this situation, the configuration information may indicate an initial frequency offset between two frequency hops.

In another example embodiment, the configuration information may be for a second frequency hopping mode. In this situation, the configuration information may indicate a plurality of lists of frequency offsets. For example, the configuration information may comprise the parameter "frequencyHoppingOffsetLists-r17" which represents SEQUENCE (SIZE (1 . . . 4)) OF frequencyHoppingOffset-r17." The parameter "frequencyHoppingOffset-r17" may be represented as "SEQUENCE (SIZE (1 . . . maxNrofHopping)) OF INTEGER (1 . . . maxNrofPhysicalResourceBlocks-1)."

In another example embodiment, the configuration information may be for a third frequency hopping mode. In this situation, the configuration information may indicate a list of frequency offsets. For example, the configuration information may comprise the parameter "frequencyHoppingOffsetLists" which represents SEQUENCE (SIZE (1 . . . 4)) OF INTEGER (1 . . . maxNrofPhysicalResourceBlocks-1)."

In some embodiments, the terminal device 110-1 may receive control information from the network device 120. In some embodiments, the control information may comprise an explicit indication (referred to as "a first indication") to indicate the target frequency hopping mode which is to be used by the terminal device 110-1. For example, one or more bits in the control information may be used to indicate the target frequency hopping mode. Alternatively, the control information may Alternatively or in addition, the control information may comprise a second indication related to the set of candidate frequency offset. For example, for the first frequency hopping mode, the second indication may indicate the multiple value of the initial frequency offset. Alternatively, in the second frequency hopping mode, the second indication may comprise one bit to indicate which list of frequency offset in the plurality of lists of frequency offset is used. Alternatively, the control information may comprise an implicit indication to indicate the target frequency hopping mode. For example, if the control information indicate the multiple value of the initial frequency offset, it may implicitly indicate that the first frequency hopping mode is used. Alternatively, if the control information comprise one bit to indicate which list of frequency offset in the plurality of lists of frequency offset is used, it may implicitly indicate that the second frequency hopping mode is used.

In some embodiments, the terminal device 110-1 may determine a target frequency hopping mode from the one or more frequency hopping modes. In some embodiments, the terminal device 110-1 may determine the target frequency hopping mode based on the control information. Alternatively, the target frequency hopping mode can be determined without the control information. For example, if a reserved bit field in the configuration information indicates "11", the terminal device 110-1 may determine that the third frequency hopping mode is triggered.

At block 520, the terminal device 110-1 determines a plurality of frequency hopping positions for the target frequency hopping mode based on the configuration information. For example, in an example embodiment, the configuration information may be for a first frequency hopping mode. The parameter M in above formulas (1) and (2) which represents the number of frequency hops may be configured by the network device 120. In some embodiments, the parameter M may be any suitable specified number, for example, 3, 4, 6 or 8. Alternatively or in addition, if the control information the multiple value of the initial frequency offset, the plurality of frequency hopping positions can be determined based on the initial frequency offset (for example, $RB_{offset}$ in above formulas (1) and (2)), the multiple value (for example, m in above formulas (1) and (2)) and the start resource block. For example, the plurality of frequency hopping positions may be obtained using the formula (1) or (2).

In other example embodiment, the configuration information may be for a second frequency hopping mode. In this situation, the terminal device 110-1 may select a target list of frequency hopping offsets based on the second indication and determine the plurality of frequency hopping positions based on the target list of frequency hopping offsets and the start resource block. For the purpose of illustrations, the plurality of lists of frequency offsets may be {{0, 50}, {0, 20, 40, 60}}. If the second indication may indicate "0", the target list of frequency hopping offset {0, 50} is selected. Thus, the plurality of frequency hopping positions may be the start RB, the start RB+50.

Alternatively, if the second indication may indicate "1", the target list of frequency hopping offset {0, 20, 40, 60} is selected. If should be noted that the second indication may indicate any suitable bit value. Thus, the plurality of frequency hopping positions may be the start RB, the start RB+20, the start RB+40 and the start RB+60.

In another example embodiment, the configuration information may be for the third frequency hopping mode. In this situation, the configuration information may indicate a list of frequency offsets. For the purpose of illustrations, the list of frequency offsets may be {0, 20, 40, 60}. Thus, the plurality of frequency hopping positions may be the start RB, the start RB+20, the start RB+40 and the start RB+60.

The terminal device 110-1 may receive a configuration related to a repetition frequency hopping pattern from the network device 120. For example, the configuration may indicate a configurable number "R." The configurable number R may be used to indicate a channel in a slot can be inferred from a channel in another slot within R slots. Alternatively, the configurable number R may be used to indicate the hopping pattern within R slot is the same start RB and hopping is for every R slot. The configuration may indicate a list of R values.

The terminal device 110-1 may also receive control information indicating the number of slots for one repetition and a further frequency offset between two repetitions. For example, the number of slots may be a specific R from the list of R values. The terminal device 110-1 may determine 2040 the repetition frequency hopping pattern based on the number of slot, the further frequency offset and the configuration. In this way, the cross slot channel estimation can be achieved, thereby improving demodulation performance.

In another example embodiment, the network device 120 may transmit resource allocation information indicating a type of resource allocation and an interlaced number. For example, the bit field of dynamic switching between is CEIL (log $2(N_{RB}^{UL} \times (N_{RB}^{UL}+1)/2))+1$. The most significant bit is to indicate the type resource allocation. The least significant bit (LSB) of CEIL (log $2(N_{INTERLACE}^{UL} \times (N_{INTERLACE}^{UL}+1)/2))$ bits provides the frequency domain resource allocation, where $N_{INTERLACE}^{UL}$ is interlace number. The terminal device 110-1 may determine allocated resources based on the type of resource allocation and the interlaced number.

Figure 6:
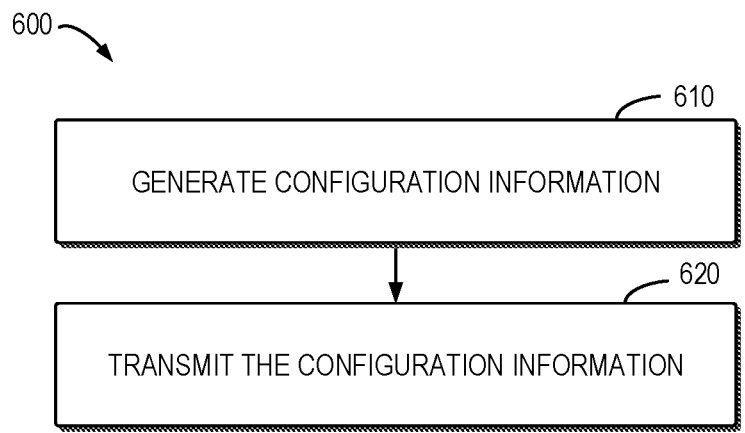
FIG. 6 illustrates a flowchart of a method implemented at a network device according to some other example embodiments of the present disclosure.

FIG. 6 shows a flowchart of an example method 600 implemented at a network device 120 in accordance with some example embodiments of the present disclosure. For the purpose of discussion, the method 600 will be described from the perspective of the network device 120.

At block 610, the network device 120 generates configuration information for one or more frequency hopping modes. In some embodiments, the configuration information may indicate a start RB for frequency hopping. The configuration information also indicates one or more frequency offsets between tow frequency hops. In this way, the frequency diversity has been increased, thereby improving enhancement coverage.

In an example embodiment, the configuration information may be for a first frequency hopping mode. In this situation, the configuration information may indicate an is initial frequency offset between two frequency hops.

In another example embodiment, the configuration information may be for a second frequency hopping mode. In this situation, the configuration information may indicate a plurality of lists of frequency offsets. For example, the configuration information may comprise the parameter "frequencyHoppingOffsetLists-r17" which represents SEQUENCE (SIZE (1 . . . 4)) OF frequencyHoppingOffset-r17." The parameter "frequencyHoppingOffset-r17" may be represented as "SEQUENCE (SIZE (1 . . . maxNrofHopping)) OF INTEGER (1 . . . maxNrofPhysicalResourceBlocks–1)."

In another example embodiment, the configuration information may be for a third frequency hopping mode. In this situation, the configuration information may indicate a list of frequency offsets. For example, the configuration information may comprise the parameter "frequencyHoppingOffsetLists" which represents SEQUENCE (SIZE (1 . . . 4)) OF INTEGER (1 . . . maxNrofPhysicalResourceBlocks–1)."

At block 520, the network device 120 transmits the configuration information to the terminal device 110-1. For example, the configuration information can be transmitted to via the RRC signaling. It should be noted that the configuration information can be transmitted via any suitable signaling.

In some embodiments, the network device 120 may transmit control information to the terminal device 110-1. In some embodiments, the control information may comprise an explicit indication (referred to as "a first indication") to indicate the target frequency hopping mode which is to be used by the terminal device 110-1. For example, one or more bits in the control information may be used to indicate the target frequency hopping mode. Alternatively, the control information may Alternatively or in addition, the control information may comprise a second indication related to the set of candidate frequency offset. For example, for the first frequency hopping mode, the second indication may indicate the multiple value of the initial frequency offset. Alternatively, in the second frequency hopping mode, the second indication may comprise one bit to indicate which list of frequency offset in the plurality of lists of frequency offset is used. Alternatively, the control information may comprise an implicit indication to indicate the target frequency hopping mode. For example, if the control information indicate the multiple value of the initial frequency offset, it may implicitly indicate that the first frequency hopping mode is used. Alternatively, if the control information comprise one is bit to indicate which list of frequency offset in the plurality of lists of frequency offset is used, it may implicitly indicate that the second frequency hopping mode is used.

The network device may transmit a configuration related to a repetition frequency hopping pattern to the terminal device 110-1. For example, the configuration may indicate a configurable number "R." The configurable number R may be used to indicate a channel in a slot can be inferred from a channel in another slot within R slots. Alternatively, the configurable number R may be used to indicate the hopping pattern within R slot is the same start RB and hopping is for every R slot. The configuration may indicate a list of R values.

The network device 120 may also transmit control information indicating the number of slots for one repetition and a further frequency offset between two repetitions. For example, the number of slots may be a specific R from the list of R values. The terminal device 110-1 may determine 2040 the repetition frequency hopping pattern based on the number of slot, the further frequency offset and the configuration. In this way, the cross slot channel estimation can be achieved, thereby improving demodulation performance.

In another example embodiment, the network device 120 may transmit resource allocation information indicating a type of resource allocation and an interlaced number. For example, the bit field of dynamic switching between is CEIL (log $2(N_{RB}^{UL} \times (N_{RB}^{UL}+1)/2))+1$. The most significant bit is to indicate the type resource allocation. The least significant bit (LSB) of CEIL (log $2(N_{INTERLACE}^{UL} \times (N_{INTERLACE}^{UL}+1)/2))$ bits provides the frequency domain resource allocation, where $N_{INTERLACE}^{UL}$ is interlace number.

Figure 7:
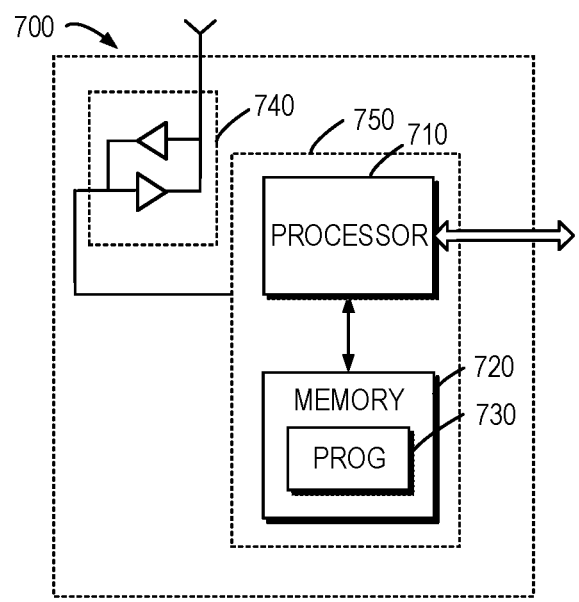
FIG. 7 illustrates a simplified block diagram of an apparatus that is suitable for implementing example embodiments of the present disclosure.

FIG. 7 is a simplified block diagram of a device 700 that is suitable for implementing embodiments of the present disclosure. The device 700 can be considered as a further example implementation of the terminal device 110 and the network device 120 as shown in FIG. 1. Accordingly, the device 700 can be implemented at or as at least a part of the terminal device 110 or the network device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 720 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIG. 2 to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment (UE) comprising:
one or more memories storing instructions; and
one or more processors configured to process the instructions to control the UE to:
receive first information, the first information indicating a first number of slots for an inter-slot frequency hopping for an uplink channel; and
determine a starting resource block (RB), during a current slot within a radio frame, based on a numerical formula:

$$RB_{start}(n') = \begin{cases} RB_{start} & \text{, if FLOOR}(n'/R)\text{mod}2 = 0 \\ (RB_{start} + RB_{offset})\text{mod}N_{BWP}^{size} & \text{, if FLOOR}(n'/R)\text{mod}2 = 1 \end{cases}$$

wherein:
RB offset corresponds to a frequency offset between two frequency hops,
RB start corresponds to the starting RB within the bandwidth part (BWP), $N_{sizeBWP}$ corresponds to a number of physical resource blocks (PRBs) in initial uplink BWP,
n' corresponds to the current slot number within the radio frame, and
R corresponds to the first number of slots.

2. The UE according to claim 1, wherein an uplink channel in a slot can be inferred from an uplink channel in another slot within a window.

3. The UE according to claim 2, wherein a length of the window corresponds to the first number of slots.

4. The UE according to claim 1, wherein the uplink channel comprises Physical Uplink Shared CHannel (PUSCH).

5. A method performed by a user equipment (UE), the method comprising:
receiving first information, the first information indicating a first number of slots for an inter-slot frequency hopping for an uplink channel; and
determining a starting resource block (RB), during a current slot within a radio frame, based on a numerical formula:

$$RB_{start}(n') = \begin{cases} RB_{start} & \text{, if FLOOR}(n'/R)\text{mod}2 = 0 \\ (RB_{start} + RB_{offset})\text{mod}N_{BWP}^{size} & \text{, if FLOOR}(n'/R)\text{mod}2 = 1 \end{cases}$$

wherein:
RB offset corresponds to a frequency offset between two frequency hops,
RB start corresponds to the starting RB within the bandwidth part (BWP), $N_{sizeBWP}$ corresponds to a number of physical resource blocks (PRBs) in initial uplink BWP,
n' corresponds to the current slot number within the radio frame, and
R corresponds to the first number of slots.

6. The method according to claim 5, wherein an uplink channel in a slot can be inferred from an uplink channel in another slot within a window.

7. The method according to claim 6, wherein a length of the window corresponds to the first number of slots.

8. The method according to claim 5, wherein the uplink channel comprises Physical Uplink Shared CHannel (PUSCH).

9. The method according to claim 5, wherein the inter-slot frequency hopping is used for Physical Uplink Shared CHannel (PUSCH) repetition over multiple slots.

* * * * *